Figure 1:
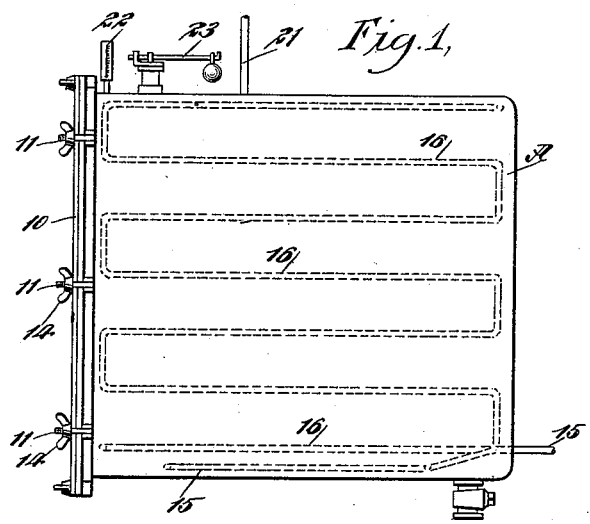

No. 651,242. Patented June 5, 1900.
T. DOUGLAS.
STEAM COOKING APPARATUS.
(Application filed Oct. 31, 1899.)
(No Model.) 2 Sheets—Sheet 1.

WITNESSES:
Edw. Thorpe

INVENTOR
Thomas Douglas
BY
ATTORNEYS

No. 651,242. Patented June 5, 1900.
T. DOUGLAS.
STEAM COOKING APPARATUS.
(Application filed Oct. 31, 1899.)
(No Model.) 2 Sheets—Sheet 2.
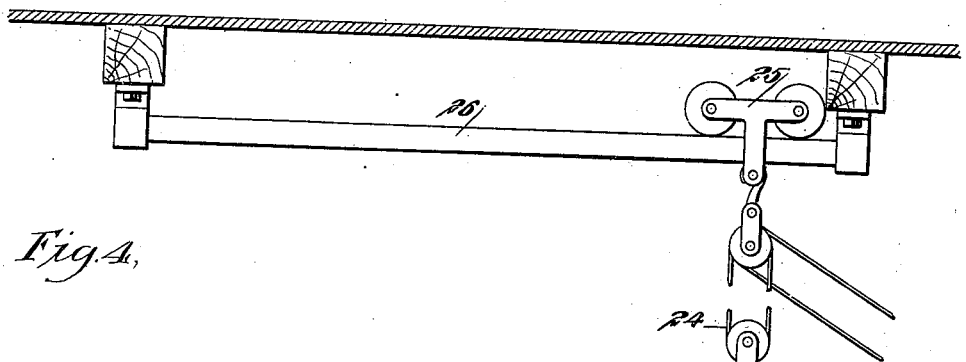
Fig. 4.
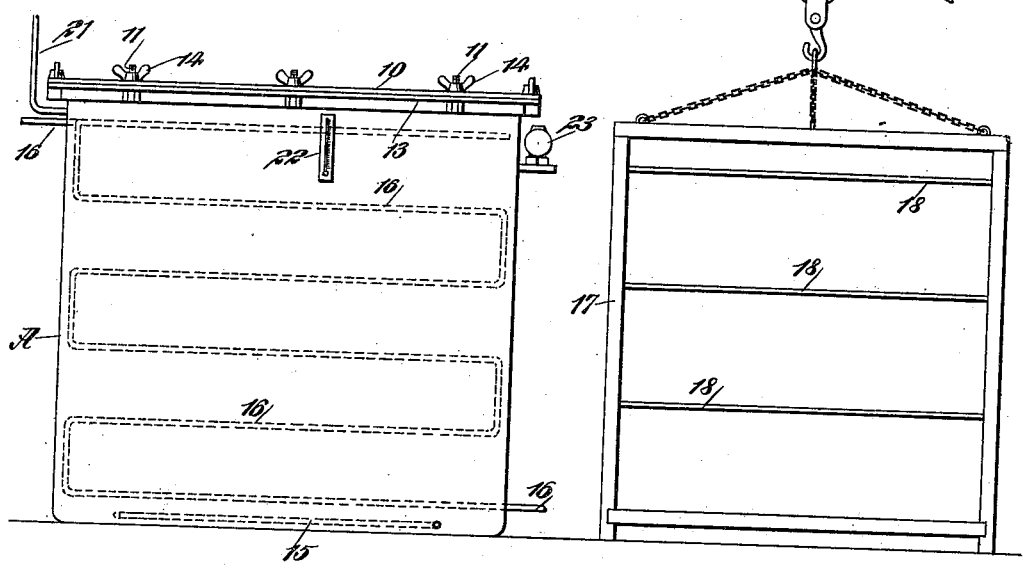
Fig. 5.
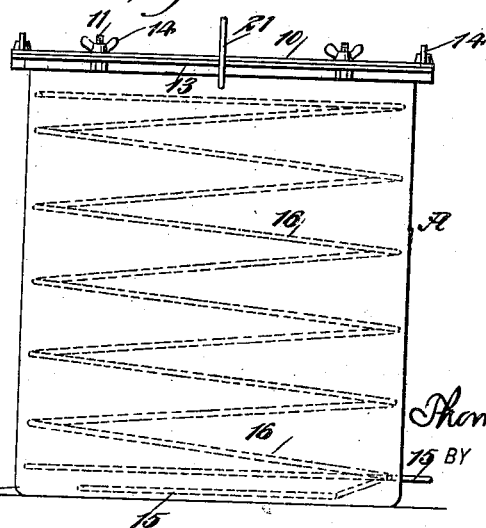
WITNESSES: Edw. Thorpe
INVENTOR Thomas Douglas
BY
ATTORNEYS
THE NORRIS PETERS CO., PHOTO-LITHO., WASHINGTON, D. C.

UNITED STATES PATENT OFFICE.

THOMAS DOUGLAS, OF LONDON, ENGLAND.

STEAM COOKING APPARATUS.

SPECIFICATION forming part of Letters Patent No. 651,242, dated June 5, 1900.

Application filed October 31, 1899. Serial No. 735,356. (No model.)

*To all whom it may concern:*

Be it known that I, THOMAS DOUGLAS, a subject of the Queen of Great Britain, and a resident of London, England, have invented a new and Improved Steam Cooking Apparatus, of which the following is a full, clear, and exact description.

The invention relates to steam cooking apparatus and is chiefly designed for the cooking of hams in large quantities in an expeditious and convenient manner.

One object of my invention is to provide simple and efficient means for drying to some extent and preventing condensation of the steam in the cooking-chamber, which steam is admitted to said chamber through a perforated pipe or coil.

Another object of the invention is to facilitate placing of the hams in and their removal from the cooking-chamber, so that the said chamber will not be required to be kept open for so long a time as hitherto to permit the removal of a quantity of cooked hams and the introduction of a fresh quantity of material to be cooked.

Hitherto steam cooking apparatus for the cooking of meat has been constructed in such manner that the cooking chamber or box is to be kept open while each joint of meat cooked therein is separately removed therefrom and each joint of meat to be cooked is separately suspended therein, with the result that there is a great loss of heat during this operation, as well as a loss of time, and in such apparatus as heretofore constructed the steam which is admitted through the perforated pipe condenses to a greater or less extent upon the interior surface of the top and sides of the cooking chamber or box and the water of condensation has to be carried off. I seek to obviate these defects or inconveniences, and to that end I provide a cooking chamber or box of suitable shape and dimensions and having, as usual, a perforate pipe or coil for the admission of steam for cooking purposes, and I also provide a cage or carriage which can be readily and expeditiously introduced into or removed from the said chamber or box and which is so constructed that the hams to be cooked can be suspended or supported therein in rows in three or in any other desired number of tiers, and I furthermore provide the said chamber or box with imperforate serpentine pipes or coils for the circulation of steam or any other suitable heating medium, which pipes or coils are situated in contact with or in close proximity to the interior surface of the top or ends and sides of the said chamber or box, so that steam or other heating medium circulating through them will heat the top or ends and sides of said chamber and maintain them at a sufficiently-high temperature to prevent condensation of the steam admitted through the said perforated pipe or coil, and the heat radiating from said heating pipe or coil will also to some extent dry the steam in said chamber.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 2:
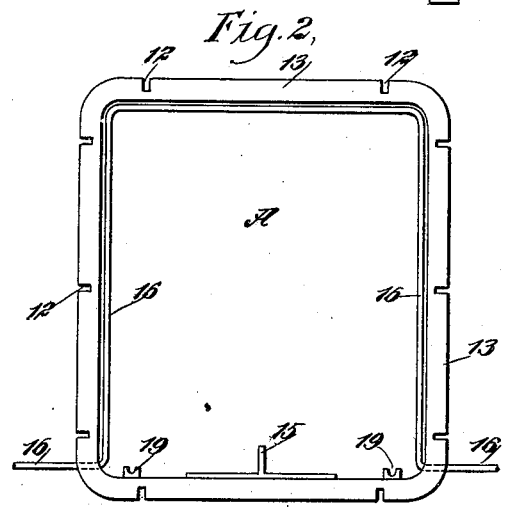
Figure 3:
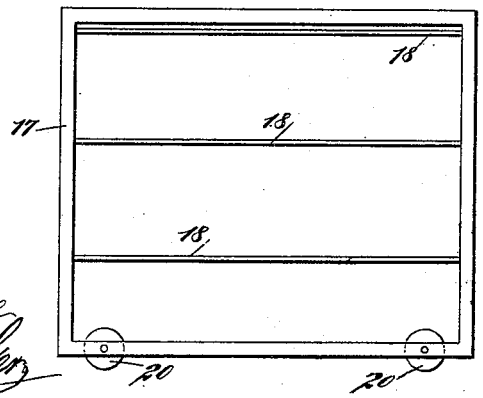

Figure 1 is a side elevation of one form of my improved apparatus. Fig. 2 is a front elevation of the same, the door being removed and the cage or carriage withdrawn. Fig. 3 is a side elevation of the cage or carriage, which is adapted for holding a large number of hams to be cooked. Fig. 4 is a side elevation of another form or modification of the apparatus and likewise a side elevation of the cage and a device for lowering the cage or carriage into the apparatus and lifting it out of the cooking-chamber, and Fig. 5 is an end elevation of the cooking-chamber shown in Fig. 4.

The apparatus may be constructed of any suitable material, and the body of the apparatus consists of a casing in which is contained a suitable cooking-chamber A, and this cooking-chamber is provided with a lid or door 10, arranged when secured in position to prevent the escape of steam, the door being secured, preferably, by hinged bolts 11, which extend through slots in the said lid or door and slots 12 in the flange 13 of the said chamber, against which the door closes, as shown in Fig. 2, and the said bolts 11 are provided with suitable wing-nuts 14. The usual perforated pipe or coil 15 is carried into the said chamber A for the admission of steam for cooking purposes. A serpentine non-perforated heating pipe or coil 16 is located within the said chamber A, extending at the sides and ends thereof and at the bottom, if desired. This coil 15 is adapted to receive steam or other heating medium, and the ends of the coil extend out through the casing, one end preferably at the bottom and the other end at the opposite side near the top. The steam or other heating medium received in the coil of non-perforated pipe 16 is for the purpose of drying the steam admitted into the chamber through the perforated pipe or coil 15, and the said non-perforated pipe or coil 16 is adapted for heating the top or ends and sides of the chamber A, so as to prevent condensation of the steam in the said chamber.

A cage or carriage 17, preferably of skeleton construction, as shown in Figs. 3 and 4, is adapted to be readily inserted into and removed from the chamber A. This cage or carriage consists of bottom bars, upright bars and top bars, and horizontal intermediate bars, the latter being designated as 18. The cage is so constructed that the hams can be suspended therein in rows from the bars or rods 18 in three tiers or in any other desired number of tiers or the hams may be placed in trays which are laid on suitable rods or bars in the said cage or carriage.

In the form of the apparatus shown in Figs. 1 to 3 the door 10 is at the front end of the chamber A, and on the floor of the latter are provided suitable rails 19, and the cage or carriage 17 is mounted upon wheels 20, so that when the cage or carriage is loaded it can be readily pushed along a platform level with the said rails and onto said rails or up an inclined plane and onto the rails 19 in the said chamber A, and the door 10 can then be closed, and when the hams contained in the said cage or carriage are cooked the door can be readily removed and said cage or carriage withdrawn from the chamber A and another cage or carriage introduced into the said chamber. The chamber A is provided with an exhaust-pipe 21, a thermometer 22, and a safety-valve 23. In this form of the apparatus the heating pipe or coil 16 extends along the top and sides of the chamber A in contact with or in proximity to the interior surface thereof. I employ any desired number of cages or carriages 17 in conjunction with a single cooking-chamber A, so that while a quantity of hams contained in one carriage or cage is being cooked the cooked hams in another carriage or cage which has just been withdrawn from the said chamber can be taken out from the said cage or carriage and replaced by other hams to be cooked. Much time is therefore saved in the use of my apparatus as compared with the forms of steam cooking apparatus heretofore devised, and I also avoid cooling of the chamber A by its being kept open for a long time.

In the form or modification of the apparatus shown in Figs. 4 and 5 the door 10 is at the top of the chamber A and the heating pipe or coil 16 extends along the ends and sides of the said chamber. The carriage or cage is in this case lowered into the chamber A and lifted therefrom by means of an overhead traveling crane or by blocks and tackle 24, suspended from a traveler 25 on an overhead beam or track 26—such, for example, as is illustrated in Fig. 4.

It is evident that although the improved apparatus is chiefly designed for the cooking of hams it can also be used for cooking other kinds of food.

Having thus described my invention, I claim as new and desire to secure by Letters Patent—

1. In a steam cooking apparatus, the combination, with a chamber having a removable door and means for locking the door thereto in a steam-tight manner, and a perforated steam-inlet pipe located within the said chamber, of an imperforate coil or pipe disposed within the said chamber near the inner walls thereof, the said imperforate coil having its inlet and outlet ends at the exterior of the chamber, the said chamber being further provided with a safety-valve and an exhaust-pipe, and a carriage arranged to fit within the said chamber and within the imperforate coil in close proximity to the perforated inlet-pipe, the said cage or carriage having means for supporting the material to be cooked, and a device for raising and lowering the said cage or carriage from and into the said chamber, as described.

2. In a steam cooking apparatus, the combination with a chamber having a removable door and means for locking the door thereto in a steam-tight manner, and a perforated steam-inlet pipe located within the said chamber, of an imperforate coil or pipe disposed within the said chamber near the inner walls thereof, the said imperforate coil having its inlet and outlet ends at the exterior of the chamber, the said chamber being further provided with a safety-valve and an exhaust-pipe, and a carriage arranged to fit within the said chamber and within the imperforate coil in close proximity to the perforated inlet-pipe, the said cage or carriage having means for supporting the material to be cooked, substantially as described.

In testimony whereof I have signed my name to this specification in the presence of two subscribing witnesses.

THOMAS DOUGLAS.

Witnesses:
GEORGE LEWIS CONROY,
HARRY HUGHES.